Aug. 3, 1937.  H. A. BOLLER  2,088,571
CHOKE VALVE
Filed May 4, 1935  2 Sheets-Sheet 1

FIG. I

HENRY A. BOLLER
*INVENTOR*

BY *Donald M. Rich*

*ATTORNEY*

Aug. 3, 1937.  H. A. BOLLER  2,088,571
CHOKE VALVE
Filed May 4, 1935  2 Sheets-Sheet 2
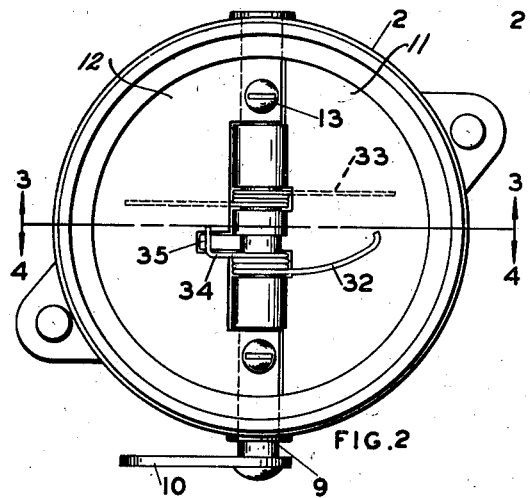
FIG.2
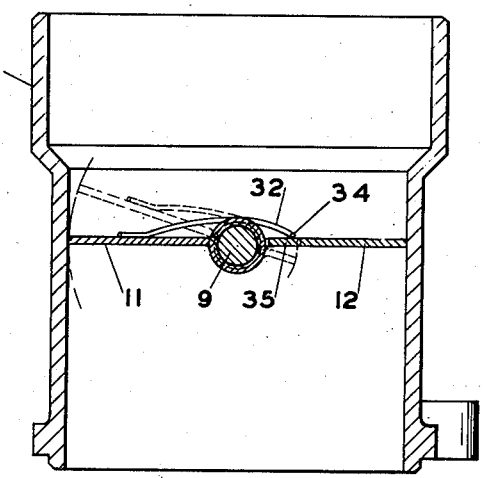
FIG.4
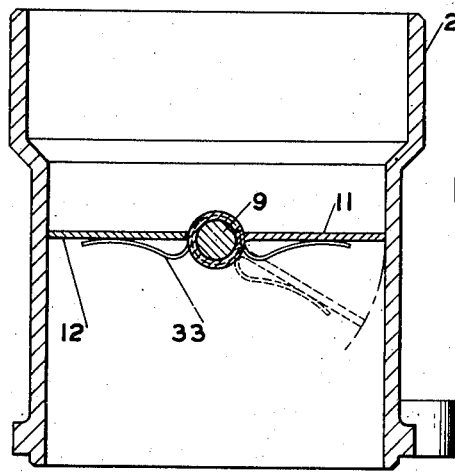
FIG.3
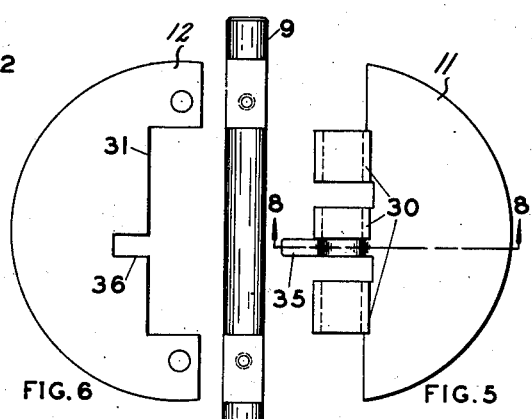
FIG.6  FIG.5
FIG.7
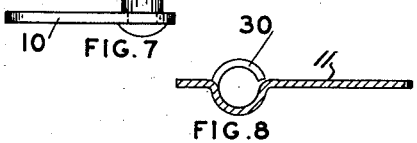
FIG.8
FIG.9
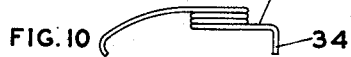
FIG.10
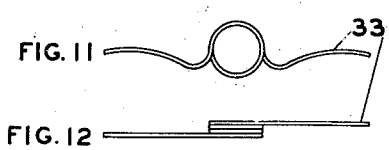
FIG.11
FIG.12
HENRY A. BOLLER
INVENTOR
BY Donald U. Rich
ATTORNEY Patented Aug. 3, 1937

2,088,571

UNITED STATES PATENT OFFICE 2,088,571

CHOKE VALVE

Henry A. Boller, Detroit, Mich.

Application May 4, 1935, Serial No. 19,846

10 Claims. (Cl. 251—11)

This invention relates to carburetors and more particularly to choke valves therefor.

In the more recent designs of plain tube carburetors, particularly the modern down-draft type wherein aspiration of fuel from the main fuel jet occurs at comparatively low suction; the manual choking of the air inlet for the purpose of increasing suction upon the main jet and thereby obtaining an enriched mixture as required by an engine, without over choking or flooding the engine, is quite beyond the skill of the average operator.

To overcome this difficulty various spring loaded choke valves, being either partially or wholly suction responsive, have been designed and manufactured.

Although these devices have functioned satisfactorily in the prevention of unduly rich mixtures, it is possible in their use for the operator to under choke or fail to provide a sufficiently rich mixture. This can and quite often does cause engine backfire, particularly in the case the engine is very cold, or the timing or ignition are incorrect or faulty.

The back pressures caused by back firing tend to forcibly close a partially open choke valve, and in many instances the force is sufficient to distort or even destroy the conventional choke valve mechanism which provides no relief for these back pressures.

It is an object of this invention to provide a novel and generally improved device for the purpose of controlling the fuel mixture delivered by a carburetor during both starting and warming up periods.

It is a further object of this invention to provide a choke valve responsive to suction and so constructed as to permit relief of back pressures caused by engine back firing.

Other objects and advantages will appear in the following specification and claims.

The invention will be better understood upon reference to the following drawings in which:

Figure 2 is a plan view of the air inlet casting as used on the carburetor shown in Figure 1.

Figure 3 is a sectional elevation of the air inlet casting taken on line 3—3 of Figure 2.

Figure 4 is a sectional elevation of the air inlet casting taken on line 4—4 of Figure 2.

Figure 5 is a top view of the hinged portion of the choke valve.

Figure 6 is a top view of the fixed portion of the choke valve.

Figure 7 is a view of the choke valve shaft.

Figure 8 is a section thru the hinged portion of the choke valve taken on line 8—8 of Figure 5.

Figure 9 is a side elevation of the back pressure release spring.

Figure 10 is a plan view of the back pressure release spring.

Figure 11 is an elevation of the breather spring.

Figure 12 is plan view of the breather spring.

Figure 1:
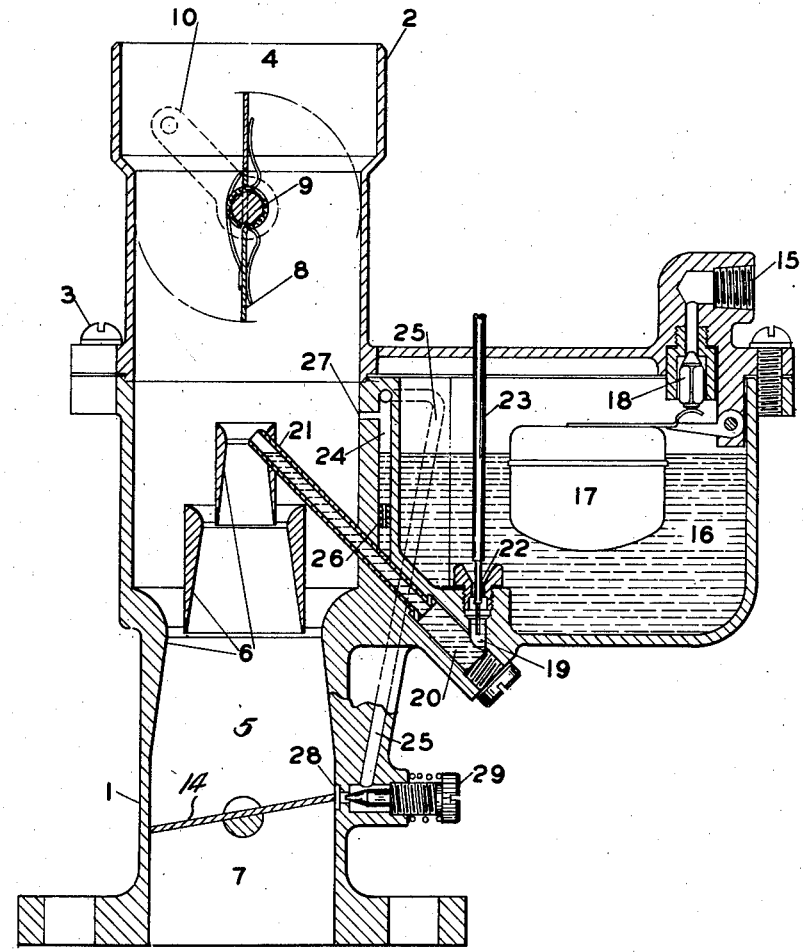
Figure 1 is a diagrammatic representation of a carburetor embodying my invention.

Referring to the drawings reference numeral 1 indicates the main body member of a carburetor, to which the air inlet casting 2 is attached by suitable means such as screws 3. A mixture conduit is formed by air inlet 4, mixing chamber 5, Venturi passages 6 and mixture outlet 7. The air inlet is controlled by the choke valve generally indicated at 8. The mixture outlet is controlled by a conventional throttle valve 14.

Fuel is admitted to the carburetor thru inlet 15 and a constant level of fuel, substantially as shown, is maintained within the float chamber 16 by a conventional float mechanism 17 and needle valve 18. For normal and high speed operation fuel is supplied to the mixture conduit thru passages 19 and 20 and discharge nozzle 21, and may be metered at restriction 22. The capacity of this restriction may be varied by a stepped metering rod 23 which may be operated either by vacuum and interconnection with the throttle, or any suitable means, not shown.

For low speed operation, fuel is admitted to the carburetor thru a conventional idling system, as shown, which includes passages 24 and 25, metering point 26, air bleed 27 and port or ports 28. The quantity of the idling mixture may be controlled by an adjustment screw 29.

The choke valve shaft 9 is mounted for rotation in the walls of the air intake casting 2, and a lever 10 is keyed or attached in any suitable manner to one end of the shaft for operation thereof. The choke valve may be manually operated by linkage from the lever 10 to an instrument board, or it may be controlled by a thermo-responsive element or in any suitable manner. Means for rotatably positioning the entire choke valve assembly in accordance with the requirements of the engine, in themselves, form no part of this invention.

The choke valve 8 is divided into two substantially semi-circular portions including a fixed portion 12 which is firmly attached to the choke valve shaft by means of screws 13 and a hinged portion 11 which is arranged for rotation about the choke shaft on bearing extensions 30. The recess 31 is provided in portion 11 for the clearance of bearings 30. The hinged portion 12 is held normally in alignment with the fixed portion 11 by the back pressure relief spring 32 and breather spring 33.

The upper spring 32 is preferably substantially stronger than the lower spring 33, thus tending to force the hinged portion 11 downwardly or clockwise. The downward movement of valve portion 11 is arrested when the two portions 11 and 12 of the choke valve become aligned, by reason of the end 34 of spring 32 coming to bear upon the projection 35 of hinged portion 11 as it moves into aligned position. The recess 36 is provided for the clearance of the projection 35.

Breather spring 33 is calibrated, and the exact pressure required to open the portion 11 of the choke downwardly varies with different installations and requirements. In general, strengthening spring 33 will provide a richer mixture and weakening this spring will provide a leaner mixture. The back pressure relief spring 32, although substantially stronger than breather spring 33, is designed to yield to a back fire pressure below that which would cause distortion or injury to the choke valve assembly.

The operation of the device is as follows:

Upon starting a cold engine under low temperature conditions the choke valve is moved to a closed position as indicated in Figures 3 and 4 causing a rich mixture to be drawn into the engine upon cranking. The breather spring 33 is calibrated to provide a proper cold starting mixture when the choke valve is in a full closed position.

As the engine fires and begins to run under its own power and while the portion 12 of the choke remains substantially horizontal in the carburetor mixing conduit, the spring loaded hinged portion 11 of the choke will function as an air valve; that is to say, portion 11 will automatically vary its position to supply a proper mixture in accordance with the engine requirements. The positioning of the choke valve assembly as a whole during the warming up period is thereby substantially less sensitive than in case of a solid or non-yieldable choke valve.

If, during the period of starting or warming up of the engine, back firing should occur with the choke valve closed or substantially closed and the throttle valve at least partially open, a high pressure tends to instantly build up within the carburetor mixing chamber. To relieve this pressure, the hinged portion 11 moves upwardly against the pressure of spring 32 thus preventing distortion of the choke valve or shaft.

After the engine is sufficiently warmed up the choke valve is moved to a full open position as shown in Figure 1 and the carburetor then continues to operate as a plain tube carburetor; that is, without any varying restriction of the air inlet in accordance with the speed and load of the engine.

The invention is not limited to the structure shown but may be modified in various respects as will occur to those skilled in the art and the exclusive use of all such modifications as come within the scope of the appended claims is contemplated.

I claim:

1. In a device of the class described, an air inlet, a butterfly type choke valve assembly mounted on a shaft for rotation therein, said choke valve assembly comprising two semi-circular portions, one portion being rigidly attached to said shaft and one portion being hinged thereon, spring means for restraining the rotation of said hinged portion in one direction with respect to said fixed portion, stronger spring means for restraining the rotation of said hinged portion in the opposite direction, and means for resisting the force of said stronger spring means when the two portions of said valve assembly are substantially aligned.

2. A choke valve for carburetors comprising a shaft, a valve section rigidly fixed to said shaft, a second valve section pivotally mounted on said shaft, said fixed valve section having a notch, and said pivoted valve section having a tongue extending into said notch, a comparatively weak spring tending to move said pivoted valve section in such a manner as to pass said tongue thru said notch, and a somewhat stronger spring overlying said notch to stop the movement of said tongue when said valve sections are in alignment with each other.

3. A choke valve comprising a pair of valve sections together forming a substantially circular disk valve, one of said sections being rigidly attached to a shaft and the other of said sections being pivotally mounted on said shaft, one of said sections being provided with a notch and the other of said sections being provided with a tongue, a weak spring for resisting movement of said pivoted portion in one direction and a stronger spring for resisting the movement of said pivoted portion in the other direction, said stronger spring having a portion overlying said notch.

4. A choke valve for carburetors comprising a shaft having a pair of flat portions thereon, said shaft having substantially cylindrical bearing portions near its ends and another bearing portion between said flat portions, and a pair of semi-circular valve sections, one of said sections being rigidly attached to said shaft at said flat portions and provided with a notch adjacent the central bearing portion of the shaft, the other of said sections being hingedly mounted on the said central bearing portion and having a tongue, the end of which lies within said notch when the two valve sections are in alignment with each other.

5. A choke valve for carburetors comprising a shaft having a pair of flat portions thereon, said shaft having substantially cylindrical bearing portions near its ends and another bearing portion between said flat portion, a pair of semi-circular valve sections, one of said sections being rigidly attached to said shaft at said flat portions and provided with a notch adjacent the central bearing portion of the shaft, the other of said sections being hingedly mounted on the said central bearing portion and having a tongue, the end of which lies within said notch when the two valve sections are in alignment with each other, and means including a pair of springs of different strength for normally holding said valve sections in alignment with each other but permitting forceable displacement of one of said valve sections with respect to the other in either direction.

6. Carburetor choke valve structure comprising a shaft, a portion rigid with said shaft, a portion rotatable on said shaft, means for manipulating said rigid portion, and oppositely acting spring means for urging said rotatable portion toward a predetermined operative relation with said rigid portion, said spring means functioning to yieldingly maintain said portions in said operative relation and said rotatable portion being movable in both directions from said relationship relative to said rigid portion.

7. A carburetor choke valve structure comprising a shaft, a valve section rigid therewith, another valve section pivotally carried thereby, a spring yieldingly resisting movement of said pivoted section in one direction, means preventing said spring from moving said pivoted section in the opposite direction beyond a predetermined position relative to said rigid section, and a weaker spring constantly urging said pivoted section in said first-mentioned direction.

8. In a carburetor, a shaft and a choke valve assembly mounted upon said shaft, said assembly comprising a portion rigidly affixed to said shaft, another portion hinged on said shaft, and counteracting springs for urging said hinged portion toward its normal operating position relative to said fixed portion.

9. In a device of the class described, an air horn, a shaft therein, a divided circular plate-type choke valve mounted on said shaft, one portion of said choke valve being rigidly fixed to said shaft and the other portion being rotatably mounted on said shaft, and means yieldingly urging said rotatable portion toward a rest position for closing the passage through said air horn when said valve is rotated to closed position, said rotatable portion being movable in either direction from said rest position relative to said fixed portion.

10. A choke valve for carburetors comprising a rotatable shaft, a substantially semi-circular valve section fixed to said shaft, another substantially semi-circular valve section pivoted on said shaft, and spring means functioning alone to hold said pivoted section in rest position, said pivoted valve section being rotatable in either direction from said rest position relative to said fixed section.

HENRY A. BOLLER.